United States Patent
Okada et al.

[11] B 3,921,623
[45] Nov. 25, 1975

[54] HEART BEATING EXAMINING APPARATUS

[75] Inventors: Hiroshi Okada; Hiroshi Horibe; Yasushi Mizuno; Shoji Yasui; Kazuo Ikegaya; Nobuo Suzumura, all of Nagoya, Japan

[73] Assignee: Fukuda Denshi Co., Ltd., Tokyo, Japan

[22] Filed: Jan. 4, 1973

[21] Appl. No.: 321,018

[44] Published under the Trial Voluntary Protest Program on January 28, 1975 as document no. B 321,018.

[52] U.S. Cl. .................... 128/2.05 P; 128/2.05 S
[51] Int. Cl.² .......................................... A61B 5/02
[58] Field of Search ..... 128/2.05 P, 2.05 R, 2.05 A, 128/2.05 N, 2.05 T, 2.05 S, 2.06 R, 2.06 F, 2.06 A, 2.06 B; 181/24

[56] References Cited
UNITED STATES PATENTS

| | | | |
|---|---|---|---|
| 3,030,946 | 4/1962 | Richards | 128/2.06 R |
| 3,132,208 | 5/1964 | Dymski et al. | 128/2.05 S X |
| 3,139,086 | 6/1964 | Botsch et al. | 128/2.05 P |
| 3,474,778 | 10/1969 | Yen | 128/2.06 F |
| 3,581,735 | 6/1971 | Gentner | 128/2.05 S |
| 3,651,798 | 3/1972 | Egli et al. | 128/2.05 P |
| 3,704,706 | 12/1972 | Herczfeld et al. | 128/2.05 T |
| R27,042 | 1/1971 | Jorgensen et al. | 128/2.05 R |

Primary Examiner—Richard A. Gaudet
Assistant Examiner—Lee S. Cohen
Attorney, Agent, or Firm—Charles E. Pfund, Esq.

[57] ABSTRACT

The heart beating examining circuit comprises a combination of a heart beating measuring circuit, a heart pulse measuring circuit and a circuit interconnecting these two circuits. The heart beating measuring circuit includes means for detecting the beating of the heart of a patient for producing signals of a plurality of frequencies, a filter for selectively passing a signal of a predetermined frequency among said signals, means for deriving out the portions of the output from the filter having a value exceeding a predetermined level, and means responsive to said portions for producing an electric pulse having a definite width. The heart pulse measuring circuit includes means for producing a heart pulse signal, and means responsive to the heart pulse signal for producing a DC signal proportional to the number of heart pulses. The interconnecting circuit includes means responsive to the DC signal for controlling the width of the electric pulse produced by the heart pulse measuring circuit.

9 Claims, 7 Drawing Figures

3,921,623

HEART BEATING EXAMINING APPARATUS

BACKGROUND OF THE INVENTION

This invention relates to apparatus for examining the beating of the heart for detecting or diagnosing heart diseases which enables a common doctor or his assistant who is not a specialist in this field to readily observe the condition of the heart.

Heretobefore the diagonose of heart diseases has been generally made by means of a stethoscope or a cardiogram depicted by electric means but such method of diagonosis requires a high degree of special knowledge and experiment. Where the diagonosis is made automatically wherein the waveform of the beating of the heart is analyzed by means of an electronic computor, even a doctor who is not a heart specialist can make accurate diagonosis but such equipment is bulky, expensive and difficult to transport for the purpose of diagonosing a plurality of men at a time.

SUMMARY OF THE INVENTION

It is therefore an object of this invention to provide a novel apparatus for examining the beating of the heart which enables a doctor who is not a heart specialist to make accurate diagonosis and is simple in construction and of low cost.

Another object of this invention is to provide improved apparatus for examining the beating of the heart capable of measuring the number of beatings during each pulse period.

Further object of this invention is to provide an improved apparatus for examining the heart capable of providing analogue and digital displays of the number of beatings.

In accordance with this invention there is provided apparatus for examining the beating of the heart comprising a combination of a heart beating measuring circuit, a heart pulse measuring circuit and a circuit for interconnecting the beating measuring circuit and the pulse measuring circuit, the heart beating measuring circuit including means for detecting the beating of the heart of a patient for producing signals of a plurality of frequencies, a filter for selectively passing a signal of a predetermined frequency among said signals, means for deriving out the portions of the output from the filter which have a value exceeding a predetermined level, and means responsive to said portions for producing an electric pulse having a definite width, the heart pulse measuring circuit including means for producing a heart pulse signal, and means responsive to the heart pulse signal for producing a DC signal proportional to the number of heart pulses and the interconnecting circuit including means responsive to the DC signal for controlling the width of the electric pulse produced by the heart beating measuring circuit.

BRIEF DESCRIPTION OF THE DRAWINGS

The invention can be more fully understood from the following detailed description taken in conjunction with the accompanying drawings in which.

DESCRIPTION OF THE PREFERRED EMBODIMENT

Figure 1:
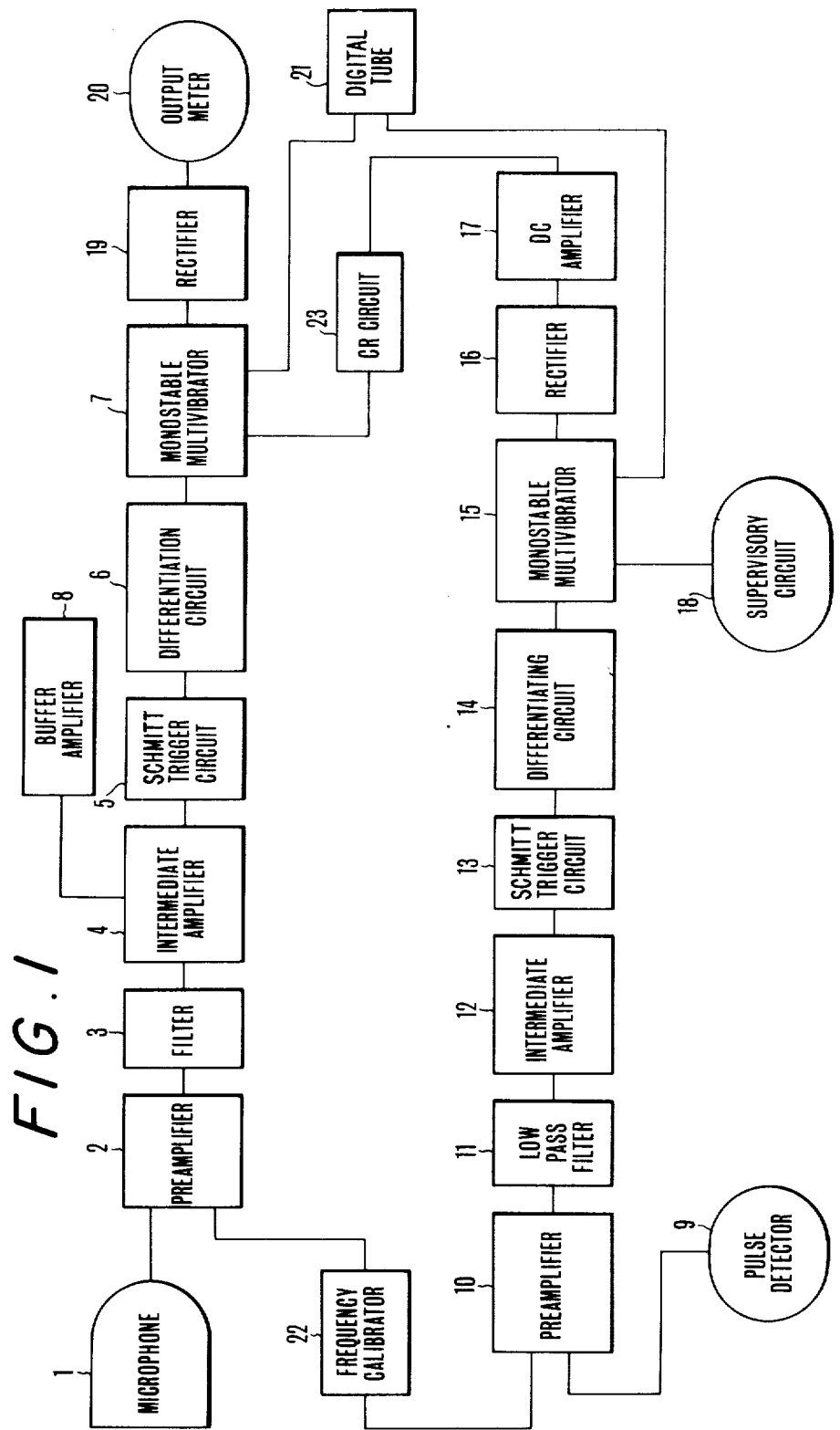
FIG. 1 shows a block diagram of one embodiment of this invention.
Figure 2:
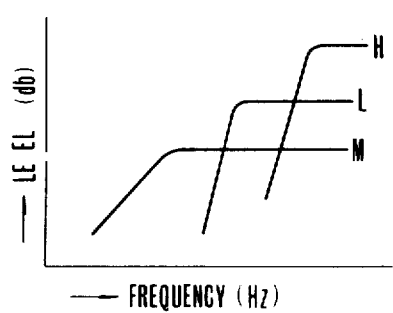
FIG. 2 is a graph showing examples of the characteristic curves of a filter utilized in the heart beating measuring circuit.
Figure 3:
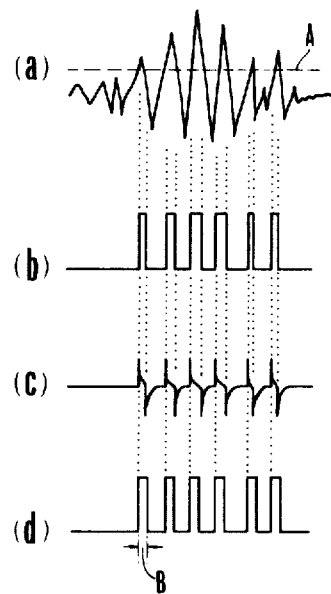
FIG. 3 shows waveforms utilized to explain the operation of the heart beating measuring circuit.

A preferred embodiment shown in FIG. 1 comprises a microphone 1 adapted to pick-up the beating of the heart. The output of the microphone 1 is applied to a filter 3 through a preamplifier 2. The filter 3 is constructed such that it will have predetermined characteristics as shown in FIG. 2 for a relatively high frequency H, a medium frequency M and a relatively low frequency L, and that it is possible to switch its output to one of these frequencies. The selected output of filter 3 is applied to a Schmitt trigger circuit 5 via an intermediate amplifier 4. The Schmitt trigger circuit 5 is constructed to derive out for measurement only the portions of the waveform that exceed a predetermined level A, as shown in FIG. 3a. The output (FIG. 3b) from the Schmitt trigger circuit 5 is differentiated by a differentiation circuit 6 so that the output waves (FIG. 3c) corresponding to signals that exceed the level A are applied to a monostable multivibrator 7 which is triggered only by a positive going pulse by which the output waves are shaped into a rectangular pulse wave having a definite pulse width B, as shown in FIG. 3d. Thus, irrespective of the individual components of the heart beating waveform there is produced an output of rectangular pulse waves a definite width and having a number equal to that of the waves that exceed the predetermined level, that is an output proportional to the number of waves that exceeds the level A. The width B of the output pulse is determined to be less than one-half $f$ where $f$ represents the upper limit of the frequencies contained in the detected heart beating.

The above described component elements constitute a heart beating measuring circuit which is constructed to include a filter circuit which operates to pass a signal of the beating of the heart of a patient at several frequencies predetermined with respect to the beating and to measure the output related to the number of output signals higher than a predetermined level.

Figure 4:
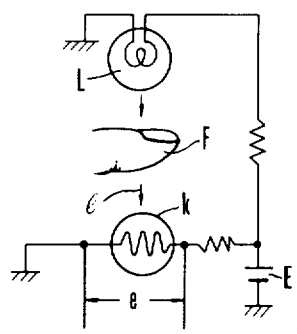
FIG. 4 is an electric circuit for explaining the operation of the pulse detecting device utilized in this invention.
Figure 5:
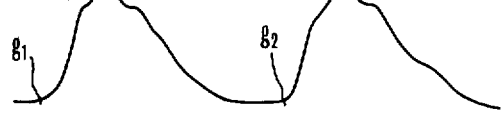
FIG. 5 shows a waveform of the pulses detected by the pulse detecting device.

Reference numeral 9 designates a pulse detecting device which is shown in FIG. 4 and comprises a source of light L adapted to project upon a finger of the patient light of a predetermined wavelength and a photoelectric element $k$ which is disposed to receive light $l$ transmitting through the tip of a finger F for producing an output $e$ as shown in FIG. 4. This arrangement utilizes the fact that the hemoglobin in the blood manifests a strong absorption for the light of said predetermined wavelength so that the waveform of the output $e$ produced by the light transmitted through the finger F includes peaks which represent the respective pulses as shown in FIG. 5. Alternatively as the pulse signal it is also possible to utilize a signal generated by the expansion and contraction of the blood vessel or by the variation in the volume thereof or a signal produced by a cardiogram which records the variation in the active potential of the heart muscle.

Figure 6:
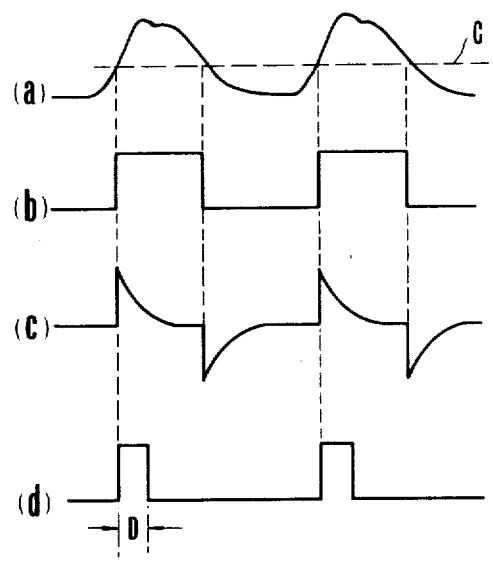
FIG. 6 shows waveforms for explaining the operation of a pulse measuring circuit utilized in this invention and FIG. 7 is a graph for determining the width of the output pulse of the heart monostable multivibrator of the beating measuring circuit utilized in this invention.

The output of the pulse detector 9 is applied to a low pass filter 11 via a preamplifier 10 to remove noise components and the output from low pass filter 11 is supplied to a Schmitt trigger circuit 13 through an intermediate amplifier 12. The Schmitt trigger circuit 13 functions to transform the portions of the output waveform from amplifier 12 which exceed a predetermined level C (see FIG. 6a) into a rectangular waveform as shown in FIG. 6b. The rectangular output is differentiated by a differentiation circuit 14 to form a pulse wave output shown in FIG. 6c and the pulse wave output is converted by the action of a monostable multivibrator 15 into a rectangular pulse wave (FIG. 6d) having a definite width D which is a little narrower than the interval of one pulse calculated by an expected upper limit of the number of pulses of a given patient. The output from the monostable multivibrator 15 is rectified by a rectifier 16 and the output thereof is amplified by a DC amplifier 17 to obtain a DC output proportional to the number of pulses.

The above described circuit elements including pulse detector 9 through DC amplifier 17 constitute a pulse measuring circuit which produces an output representing the number of pulses in response to the signals representing the pulse of the patient. It should be understood that the pulse measuring circuit is not limited to the illustrated construction and that many other modifications are obvious to one skilled in the art.

According to this invention there is also provided a circuit for interconnecting the heart beating measuring circuit and the pulse measuring circuit for the purpose of measuring the output of the pulse measuring circuit in one pulse period by controlling the beating measuring circuit by the output from the pulse measuring circuit. Thus, for example, the pulse measuring circuit is constructed such that it produces sharp pulses at the beginning $g_1$ and at the end $g_2$ of one pulse period of the pulse wave as shown in FIG. 5 and the connecting circuit is constructed such that the beating measuring circuit is opened and closed by the pulse signals. By adding a memory circuit which stores output of the beating measuring circuit at the time when it is opened it is possible to determine the number of the signals representing the beatings during one pulse period. In the case wherein such arrangement is used for controlling the beating measuring circuit by the pulse measuring circuit the beating measuring circuit may be constructed as shown in FIG. 1 whereas the pulse measuring circuit should be different from that shown in FIG. 1 for the reason described above. In the latter case only one pulse of a number of recurrent pulses is measured for diagonosing the heart disease by measuring the beating.

However, the embodiment to be described hereunder and illustrated in FIG. 1 is constructed to measure the number of beating signals during each period of recurrent pulses at the time of diagnosing a patient.

More particularly, referring again to FIG. 1, in the circuit interconnecting the beating measuring circuit and the pulse measuring circuit, the output from DC amplifier 17 in the pulse measuring circuit is applied to a bias circuit of a CR time constant circuit 23 which determines the width of the output pulse of the monostable multivibrator 7 in the beating measuring circuit.

Figure 7:
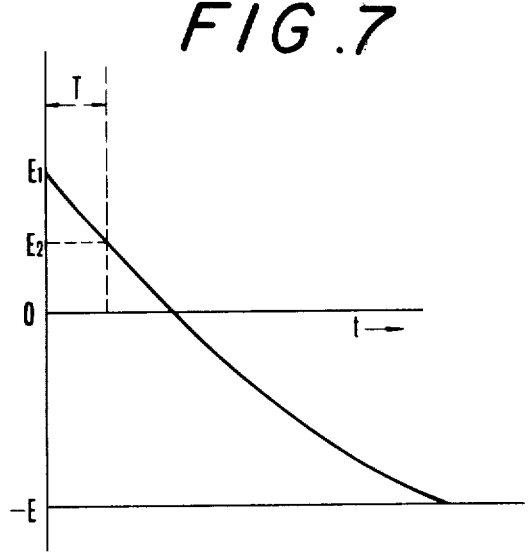

With reference now to the characteristic curve of the monostable multivibrator 7 as shown in FIG. 7, where the output potential of the monostable multivibrator at $t = 0$ is denoted by a high value $E_1$, the base potential after an interval T representing the width of the rectangular pulse wave by $E_2$, and the bias potential by E, following equation holds.

$$\epsilon^{-t/CR} = (E + E_2)/(E + E_1)$$

so that under the conditions of $T/CR \ll 1$ and $E \gg E_1$ $$1/E \approx T/CR\,(E_1 - E_2).$$

This shows that the pulse width T is inversely proportional to the bias potential E. In an actual circuit, the condition $T/CR \ll$ holds true but the condition $E \gg E_1$ does not hold so that the latter condition introduces an error. However, this error can be neglected in the ordinary range of the pulse frequency.

In this manner, the output pulse width T from the monostable multivibrator 7 is controlled by the output from the heart pulse measuring circuit as inversely proportional to the period of heart pulses so that the output obtained by rectifying the output from the monostable multivibrator 7 by means of a rectifier 19 will not be affected by the length of the heart pulse period. The output from the rectifier 19 is displayed as an analog quantity by an output meter. Further, the output from the monostable multivibrator 7 and 15 applied to a digital tube 21 to digitally display the number of heart beats in one pulse period. The digital tube 21 could thus be replaced by the memory previously mentioned or itself serve as a memory indicator of beatings during one pulse period.

A buffer amplifier 8 is provided to amplify a portion of the output of the intermediate amplifier 4. Amplifier 8 is used as a monitor for performing a fine analysis of a beating diagram or comparing the measured beating diagram with an existing beating diagram pattern. To supervise the operation of the pulse measuring circuit there is provided a supervisory circuit for lighting a display lamp (not shown) which is operated by the pulse output appearing at each pulse. Associated with both beating measuring circuit and the pulse measuring circuit is a frequency calibrating circuit 22 which uses the commercial frequency of 50Hz or 60Hz as the reference frequency.

According to this invention, it is possible to select a heart noise of a desired frequency among a number of heart noises which comprise the beating thereby simply determining not only the quantity of a characteristic heart noise exceeding a predetermined level but also the quantity of the noises of different frequency bands. By establishing a standard of diagonosis for each type of the heart disease as well as suitable standards for such quantities, even a non specialist doctor can perform an accurate diagonosis by comparing the data obtained by using the novel apparatus with said standards. Further, a nurse or a sanitary superviser can readily find out at the early stage of the disease whether the function of the heart is normal or not. Thus the novel apparatus contributes greatly to the mass diagonosis of the heart disease and to the health control of the inhabitants residing in areas where the number of doctors is insufficient.

While the invention has been shown and described in terms of a particular embodiment, it should be understood that the invention is not limited to this embodiment but many changes and modifications will readily occur to one skilled in the art without departing from the scope of the invention as defined in the appended claims.

What is claimed is:

1. Apparatus for examining the beating of the heart comprising a combination of a heart beating measuring circuit, a heart pulse measuring circuit and a circuit for interconnecting said beating measuring circuit and said pulse measuring circuit, said heart beating measuring circuit including means for detecting the beating of the heart of a patient for producing signals of a plurality of frequencies, a filter coupled to receive said signals for selectively passing a signal of a predetermined frequency among said signals, means for deriving out the portions of the output from said filter which have a value exceeding a predetermined level, and means responsive to each of said portions for producing an electric pulse having a definite width; said heart pulse measuring circuit including means for producing a heart pulse signal, and means responsive to said heart pulse signal for producing a DC signal proportional to the period of heart pulses, and said interconnecting circuit including means responsive to said DC signal for controlling the width of said electric pulse produced by said beating measuring circuit inversely related to said period.

2. The apparatus according to claim 1 wherein said means for deriving out the portions of the output from the filter which have a value exceeding a predetermined level comprises a Schmitt trigger circuit and said means for producing said electric pulse of a definite width comprises a differentiating circuit means which differentiates the output from said Schmitt trigger circuit and a monostable multivibrator means which converts the output from said differentiating circuit means into said pulse of the definite width, the number of said pulses being equal to said portions that exceed said predetermined level.

3. The apparatus according to claim 2 wherein said interconnecting circuit comprises a CR time-constant circuit means for controlling the operation of said monostable multivibrator means and means for applying said DC signal produced by said heart pulse measuring circuit to said beating measuring circuit as a bias voltage to vary the width of said electric pulse.

4. The apparatus according to claim 2 which further comprises a rectifier means for rectifying the output of said monostable multivibrator means and means responsive to the output from said rectifier means to provide an analogue display.

5. The apparatus according to claim 2 which further comprises means responsive to the output of said monostable multivibrator and said heart pulse signal for providing a digital display of the number of heart beats in one pulse period.

6. The apparatus according to claim 1 wherein said means for producing said DC signal comprises a Schmitt trigger circuit means responsive to said heart pulse signal for converting the portions thereof exceeding a predetermined level into a rectangular wave, a differentiating circuit means for differentiating said rectangular wave, a monostable multivibrator means responsive to the output from said differentiating circuit means for producing a pulse having a definite width and a rectifier means for rectifying said pulse to produce said DC signal.

7. The apparatus according to claim 1 wherein said means for producing said heart pulse signal comprises a source of light having a predetermined wavelength and a photoelectric element disposed to receive said light after it has been partially absorbed by the hemoglobin in the blood of a patient for producing an electric pulse corresponding to the heart pulse of said patient.

8. The apparatus according to claim 1 which further includes a memory circuit means responsive to said period of said heart pulses for storing the output from said beating measuring circuit for determining the number of beatings during one heart pulse period.

9. The apparatus according to claim 1 wherein said means in said interconnecting circuit includes means responsive to said DC signal for controlling the width of the output pulse from said beating measuring circuit inversely proportional to the period of said heart pulses.

* * * * *